United States Patent
Krull et al.

(10) Patent No.: US 8,298,402 B2
(45) Date of Patent: Oct. 30, 2012

(54) ADDITIVES FOR IMPROVING THE COLD FLOWABILITY AND LUBRICITY OF FUEL OILS

(75) Inventors: Matthias Krull, Harxheim (DE); Carsten Cohrs, Burghausen (DE); Heidi Rausch, Garching/Alz (DE)

(73) Assignee: Clariant Produkte (Deutschland) GmbH, Frankfurt am Main (DE)

( * ) Notice: Subject to any disclaimer, the term of this patent is extended or adjusted under 35 U.S.C. 154(b) by 517 days.

(21) Appl. No.: 11/525,705

(22) Filed: Sep. 22, 2006

(65) Prior Publication Data
US 2007/0062102 A1 Mar. 22, 2007

(30) Foreign Application Priority Data
Sep. 22, 2005 (DE) .......................... 10 2005 045 134

(51) Int. Cl.
C10G 71/00 (2006.01)
(52) U.S. Cl. ............ 208/18; 526/312; 44/440; 524/474; 528/125; 528/129
(58) Field of Classification Search .................... 44/331, 44/440, 436; 524/474; 526/312; 528/125; 528/129; 208/18
See application file for complete search history.

(56) References Cited

U.S. PATENT DOCUMENTS

| | | | |
|---|---|---|---|
| 2,499,368 A | | 3/1950 | Degroote |
| 3,578,422 A | * | 5/1971 | Dorer ............................... 44/331 |
| 3,705,862 A | | 12/1972 | Stieger et al. |
| 4,147,854 A | * | 4/1979 | Skillicorn ..................... 526/312 |
| 4,211,534 A | | 7/1980 | Feldman |
| 4,670,516 A | | 6/1987 | Sackmann et al. |
| 5,021,498 A | | 6/1991 | Stephenson |
| 5,039,437 A | | 8/1991 | Martella et al. |
| 5,089,589 A | | 2/1992 | Hesse |
| 5,096,996 A | | 3/1992 | Hesse et al. |
| 5,186,720 A | | 2/1993 | Feustal et al. |
| 5,391,632 A | | 2/1995 | Krull et al. |
| 5,707,946 A | | 1/1998 | Hiebert |
| 5,766,273 A | | 6/1998 | Dralle-Voss et al. |
| 5,998,530 A | * | 12/1999 | Krull et al. .................... 524/474 |
| 6,232,277 B1 | | 5/2001 | Ledeore |
| 6,248,142 B1 | * | 6/2001 | Caprotti ......................... 44/440 |
| 6,258,135 B1 | * | 7/2001 | Caprotti et al. ................. 44/389 |
| 2004/0006912 A1 | | 1/2004 | Krull |
| 2004/0010072 A1 | | 1/2004 | Krull |
| 2005/0000151 A1 | | 1/2005 | Jackson |
| 2007/0221539 A1 | | 9/2007 | Cohrs et al. |

FOREIGN PATENT DOCUMENTS

| | | |
|---|---|---|
| CA | 2017126 | 11/1990 |
| EP | 0061894 | 10/1982 |
| EP | 0154177 | 9/1985 |
| EP | 0311452 | 4/1989 |
| EP | 0311452 * | 12/1989 |
| EP | 0362727 | 4/1990 |
| EP | 0398101 | 11/1990 |
| EP | 0413279 | 2/1991 |
| EP | 0606055 | 7/1994 |
| EP | 1380633 * | 1/2004 |
| EP | 1482024 | 12/2004 |
| EP | 1767611 | 3/2007 |
| ER | 0857778 | 8/1998 |
| GB | 1167427 * | 12/1967 |
| GB | 1173975 | 10/1969 |
| WO | WO9606902 | 3/1996 |
| WO | WO9816597 | 4/1998 |
| WO | WO9961562 | 12/1999 |

OTHER PUBLICATIONS

Nicholas P. Cheremisinoff, Polymer Characterization: Laboratory Techniques and Analysis, 1996, 1st edition, Appendix D, p. 152.*
German Patent Office, Office Action for Corresponding Application No. DE 16141482, dated Jul. 4, 2006.
EP Search Report for Application No. EP06018633, dated Jul. 6, 2010.

* cited by examiner

*Primary Examiner* — Michael Marcheschi
*Assistant Examiner* — Chantel Graham
(74) *Attorney, Agent, or Firm* — Tod A. Waldrop

(57) ABSTRACT

The present invention relates to alkylphenol-aldehyde resins containing oligo- or polymers having a repeat structural unit of the formula $$\left[ \begin{array}{c} \text{structure with } OR^3, R^4, R^2, R^1, (R^5)_k \end{array} \right]_n$$

where
$R^1$ is a branched alkyl or alkenyl radical which has from 10 to 40 carbon atoms and bears at least one carboxyl, carboxylate and/or ester group,
$R^2$ is hydrogen or $R^1$
$R^3$ is hydrogen or an alkoxy group of the formula
$-(A-O)_m-H$,
A is a $C_2$- to $C_4$-alkylene group,
m is from 1 to 100,
$R^4$ is hydrogen, a $C_1$- to $C_{11}$-alkyl radicals or a carboxyl group,
$R^5$ is $C_1$-$C_{200}$-alkyl or -alkenyl, O—$R^6$ or O—C(O)—$R^6$,
$R^6$ is $C_1$-$C_{200}$-alkyl or -alkenyl,
n is from 1 to 100 and
k is 1 or 2.

17 Claims, No Drawings

ADDITIVES FOR IMPROVING THE COLD FLOWABILITY AND LUBRICITY OF FUEL OILS

This Application claims benefit of foreign priority under 35 U.S.C. 119 (b) to DE 10 2005 045 134.9 the entire disclosure of which is hereby incorporated herein by reference.

The present invention relates to alkylphenol-aldehyde resins which contain structural units of fatty acids or derivatives thereof, and which have improved performance properties as additives for fuel oils.

Polycyclic aromatic hydrocarbons are constituents of all relatively high-boiling fractions in the distillation of crude oil. They are considered to be harmful to the health of living beings and to the environment. The content of polycyclic aromatic hydrocarbons in fuel oils is therefore being lowered ever further, as a result of which effects including a reduction of emissions of particles harmful to health in exhaust gases are achieved. The health objections with regard to the polycyclic aromatic hydrocarbons, also known as polyaromatics, for example naphthalene which is suspected of causing cancer, are causing a search for ways to reduce these substances in industrial products. For the same reason, for fuel oils based on renewable raw materials, there is a search for means of replacing the hydrocarbons of mineral origin which are often used as a solvent for the preparation of additives by renewable raw materials. Polyaromatic hydrocarbons are understood here to mean compounds which contain at least two fused aromatic rings.

To improve the use properties, various types of additives are added to fuel oils of mineral and also of animal and vegetable origin. These are predominantly synthetic monomeric and also polymeric compounds. A class of compounds used for various purposes is that of alkylphenol resins and derivatives thereof, which are prepared by condensation of alkylphenols with aldehydes under acidic or basic conditions. For example, alkylphenol resins are used in middle distillates as cold flow improvers, lubricity improvers, oxidation inhibitors, corrosion inhibitors and asphalt dispersants, and alkoxylated alkylphenol resins are used as demulsifiers. In addition, alkylphenol resins are used as stabilizers for jet fuel. Resins of benzoic esters with aldehydes or ketones are also used as cold additives for fuel oils.

Typically, the condensation reaction for preparing alkylphenol resins is carried out in relatively high-boiling aromatic solvents. Moreover, alkylphenol resins, which are highly viscous or brittle polymers per se, have to be dissolved in a solvent for use as additives for fuel oils. Owing to the physicochemical properties of the alkylphenol resins, preference is given to relatively high-boiling aromatic hydrocarbons or technical hydrocarbon mixtures both for the condensation and for the preparation of concentrates. These contain typically 10% by weight and more of polyaromatic hydrocarbons. Owing to their dissolution properties, aliphatic hydrocarbons are unsuitable for alkylphenol resins.

Often, even the performance of the known additives is unsatisfactory. Especially in fuel oils which have been refined under hydrogenating conditions and have a low sulfur and aromatics content and a simultaneously high content of n-paraffins, the effectiveness of the prior art cold flow improvers and paraffin dispersants is insufficient. Moreover, the compatibility of alkylphenol resins with further additives such as ethylene copolymers and polar nitrogen compounds in additive packages is often insufficient, which results in phase separations.

EP-A-0 311 452 discloses alkylphenol-formaldehyde condensates as cold additives for fuels and lubricant oils.

EP-A-0 857 776 and EP-A-1 088 045 disclose the use of alkylphenol resins in combination with ethylene copolymers and nitrogen-containing paraffin dispersants for improving the cold properties of middle distillates.

EP 0 935 645 discloses the use of alkylphenol resins for improving the lubricity of low-sulfur middle distillates.

EP-A-1 482 024 discloses condensates of p-hydroxybenzoic esters and aldehydes or ketones as cold additives for fuel oils.

EP-A-0 381 966 discloses a process for preparing novolaks by condensing phenols with aldehydes while separating out water azeotropically.

EP-A-1 380 633 discloses oxidation-stabilized oily liquids which comprise esters of fatty acids whose carbon chain lengths have between 8 and 30 carbon atoms, and a monohydric C1-C5 alcohol, and at least one alkylphenol-aldehyde resin. The resins may be prepared and used without solvent.

In the context of the present invention, alkylphenol resins are understood to mean all polymers which are obtainable by condensation of a phenol bearing alkyl radicals with aldehydes or ketones. The alkyl radical may be bonded to the aryl radical of the phenol directly via a C—C bond, or else via functional groups such as esters or ethers. The phenol may be alkoxylated.

It is thus an object of the present invention to find an additive for improving both the cold properties and the lubrication properties of mineral oil distillates, which is substantially free of monomeric or low molecular weight polyaromatic compounds. It is a further object of the invention to improve the compatibility between alkylphenol resins and further additive components, in particular further cold additive components, in order to prevent phase separations in additive packages which comprise a plurality of active ingredients.

It has been found that the condensation of alkylphenols with aldehydes in the presence of fatty acids having 2-50 carbon atoms or derivatives, for example their esters with alcohols having from 1 to 10 carbon atoms and from 1 to 5 OH groups, leads to resins having improved performance properties as additives for fuel oils. Especially in combination with ethylene copolymers and optionally polar nitrogen compounds, they exhibit improved effectiveness as cold flow improvers and lubricity additives compared to conventional resins. The compatibility between the three polymer groups is also distinctly improved. Consequently, no additional solubilizers are required to prevent phase separation. At the same time, the fatty acids mentioned and their derivatives are suitable solvents for preparing additive concentrates.

The invention thus provides alkylphenol-aldehyde resins containing oligo- or polymers having a repeat structural unit of the formula

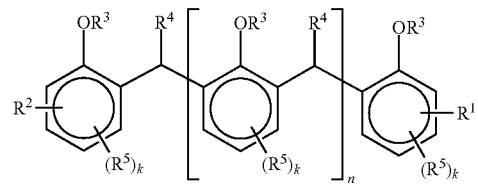

where $R^1$ is a branched alkyl or alkenyl radical which has from 10 to 40 carbon atoms and bears at least one carboxyl, carboxylate and/or ester group, $R^2$ is hydrogen or $R^1$ $R^3$ is hydrogen or an alkoxy group of the formula

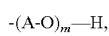

A is a $C_2$- to $C_4$-alkylene group, m is from 1 to 100, $R^4$ is hydrogen, a $C_1$- to $C_{11}$-alkyl radicals or a carboxyl group, $R^5$ is $C_1$-$C_{200}$-alkyl or -alkenyl, O—$R^6$ or O—C(O)—$R^6$,
$R^6$ is $C_1$-$C_{200}$-alkyl or -alkenyl,
n is from 1 to 100 and
k is 1 or 2.

The invention further provides fuel compositions which have a sulfur content of less than 350 ppm and comprise from 1 to 1000 ppm of the inventive alkylphenol-aldehyde resin and a liquid fuel which is a mineral oil distillate and/or an oil obtained from vegetable or animal raw materials.

The invention further provides for the use of the inventive alkylphenol-aldehyde resin for improving the lubricity of middle distillates having a sulfur content of less than 350 ppm.

The invention further provides for the use of the inventive alkylphenol-aldehyde resin for improving the cold flowability of middle distillates having a sulfur content of less than 350 ppm and of fuel oils of vegetable and/or animal origin.

A is preferably an ethylene and/or propylene group, in particular an ethylene group.

m is preferably from 2 to 50, in particular from 3 to 20.

$R^4$ is preferably hydrogen or $C_1$- to $C_3$-alkyl, in particular hydrogen.

$R^6$ is preferably $C_4$-$C_{20}$-alkyl or -alkenyl and in particular $C_6$-$C_{16}$-alkyl or -alkenyl.

$R^5$ is more preferably $C_4$-$C_{20}$-alkyl or -alkenyl and in particular $C_6$-$C_{16}$-alkyl or -alkenyl, for example $C_6$-$C_{12}$-alkyl or -alkenyl.

n is preferably from 2 to 50 and especially from 3 to 25, for example from 5 to 15.

k is preferably 1. It is also preferred that k is equal to 1 and $R^5$ is in the para-position to the $OR^3$ group.

$R^1$ is preferably a $C_{12}$-$C_{24}$-alkyl- or alkenyl radical and in particular a $C_{16}$-$C_{20}$-alkyl or alkenyl radical. The $R^1$ radical is preferably bonded to the aromatic ring system via a secondary carbon atom of the alkyl chain. This bond results from the alkylation of the phenol via a double bond of the unsaturated fatty acid or of the unsaturated fatty acid derivative, which determines its position within the side chain. The $R^1$ radical is preferably saturated. In a further preferred embodiment, the $R^1$ radical contains one or two double bonds, in particular one double bond. The $R^1$ radical preferably bears a terminal carboxyl group. In a further preferred embodiment, the $R^1$ radical bears a terminal ester moiety whose alcohol component derives from an alcohol having from 1 to 5 carbon atoms and from 1 to 6 OH groups. This ester more preferably derives from alcohols having from 1 to 4 carbon atoms, for example methanol, ethanol and propanol.

Carboxylic acid groups present in the inventive alkylphenol resin may, after the condensation, be neutralized fully or partly, for example to an extent of 90%, to an extent of 70%, to an extent of 50%, to an extent of 25% or to an extent of 10%. This is preferably done with ammonia, amines or aromatic bases. Suitable amines are primary, secondary and tertiary amines whose alkyl radicals each independently bear from 1 to 24 carbon atoms, preferably from 4 to 22 carbon atoms. Particular preference is given to primary and secondary amines having at least one $C_{12}$- to $C_{24}$-alkyl radical, for example coconut fatty amine, tallow fatty amine, dicoconut fatty amine, ditallow fatty amine, dibehenylamine and mixtures thereof. Equally suitable for neutralization are aromatic bases which contain a cyclic, fully conjugated hydrocarbon skeleton with 4n+2 π-electrons and at least one heteroatom capable of salt formation, preferably nitrogen, for example pyridine and imidazole.

Carboxylic acid groups present in the inventive alkylphenol resin may, after the condensation, be reacted fully or partly with alkylene oxides, for example to an extent of 90%, to an extent of 70%, to an extent of 50%, to an extent of 25% or to an extent of 10%. Suitable alkylene oxides are ethylene oxide, propylene oxide, butylene oxide and mixtures thereof. The oxalkylation is effected preferably with from 1 to 100 mol, in particular with from 5 to 20 mol, of alkylene oxide by carboxylic acid group.

The inventive alkylphenol-aldehyde resins are obtainable, for example, by condensing the corresponding alkylphenols with an aldehyde or ketone, for example formaldehyde, i.e. preferably from 0.5 to 1.5 mol, in particular from 0.8 to 1.2 mol, of aldehyde or ketone per mole of alkylphenol, the condensation being effected in the presence of a fatty acid or of a fatty acid derivative, preferably of a fatty acid alkyl ester. The condensation is carried out preferably in the presence of from 1 to 70% by weight, preferably from 3 to 60% by weight, in particular from 5 to 50% by weight, of the fatty acid or of the fatty acid ester based on the total amount of alkylphenol, aldehyde or ketone and fatty acid or fatty acid ester. Fatty acid or fatty acid ester may be added as a reagent at low concentrations, for example from 1 to 10% by weight and preferably from 2 to 5% by weight, but they are more preferably added in larger amounts of from 10 to 70% by weight and especially from 20 to 60% by weight, which lowers the viscosity of the reaction mixture and thus eases its handling. Excess fatty acid or fatty acid derivative can be removed after the reaction has ended, for example by distillation; but they preferably remain in the resin. The inventive alkylphenol resins and the fuel oils comprising them contain preferably from 0.2 to 5 parts by weight, more preferably from 0.3 to 3 parts by weight, for example from 0.5 to 2 parts by weight, of at least one fatty acid or a fatty acid derivative, especially a fatty acid ester, per part by weight of alkylphenol resin.

The condensation is effected preferably between 70 and 200° C., for example between 90 and 160° C. It is catalyzed typically by from 0.05 to 5% by weight of bases or acids. The catalysts used for the condensation reactions of alkylphenol and aldehyde are, as well as carboxylic acids such as acetic acid and oxalic acid, in particular strong mineral acids such as hydrochloric acid, phosphoric acid and sulfuric acid, and also sulfonic acids. Particularly suitable catalysts are sulfonic acids which contain at least one sulfonic acid group and at least one saturated or unsaturated, linear, branched and/or cyclic hydrocarbon radical having from 1 to 40 carbon atoms and preferably having from 3 to 24 carbon atoms. Particular preference is given to aromatic sulfonic acids, especially alkylaromatic monosulfonic acids having one or more $C_1$-$C_{28}$-alkyl radicals and in particular those having $C_3$-$C_{22}$-alkyl radicals. The alkylaromatic sulfonic acids preferably bear one or two alkyl radicals, in particular one alkyl radical. The parent aryl groups are preferably mono- and bicyclic, in particular monocyclic. In a preferred embodiment, the aryl groups do not bear any carboxyl groups and they especially bear only sulfonic acid and alkyl groups. Suitable examples are methanesulfonic acid, butanesulfonic acid, benzenesulfonic acid, p-toluenesulfonic acid, xylenesulfonic acid, 2-mesitylenesulfonic acid, 4-ethylbenzenesulfonic acid, isopropylbenzenesulfonic acid, 4-butylbenzenesulfonic acid, 4-octylbenzenesulfonic acid, dodecylbenzenesulfonic acid, didodecylbenzenesulfonic acid, naphthalenesulfonic acid. Mixtures of these sulfonic acids are also suitable. Typically, after the reaction has ended, they remain in the product as such or in neutralized form.

The acidic catalyst used for the condensation of the alkylphenol resin is preferably neutralized with a base such as sodium hydroxide solution or potassium hydroxide solution, or preferably with amines or aromatic bases. The neutralization is effected preferably by reacting the acid used as a catalyst with from 0.8 to 10 mol of base, preferably from 0.9 to 5 mol of base, more preferably from 0.95 to 2 mol of base, for example in about an equimolar amount. Especially in the case of polybasic acids and/or bases, the number of moles of all of the acid and base groups converted is considered. The salt formed can subsequently be removed, but it preferably remains in the alkylphenol resin.

The inventive fuel oils contain preferably from 1 to 1000 ppm, more preferably from 5 to 150 ppm and especially from 10 to 100 ppm of at least one inventive alkylphenol resin.

Especially suitable in accordance with the invention are those alkylphenol-aldehyde resins which derive from alkylphenol resins having 1 or 2 alkyl radicals in the ortho- and/or para-position to the OH group. Particularly preferred starting materials are alkylphenols which bear two hydrogen atoms capable of condensation with aldehydes on the aromatic, and especially monoalkylated phenols. The alkyl radical is more preferably in the para-position to the phenolic OH group. For the preparation of the inventive resins, preference is given to using alkylphenols which consist to an extent of at least 50 mol % of p-alkylphenols, more preferably of at least 70 mol % and especially of more than 90 mol %, for example of more than 95 or more than 97 mol %, of p-alkylphenols based on the entirety of the alkylphenols used. The proportion of trifunctional phenols, which can enter into condensation with aldehydes via two ortho- and one para-position to the OH group, is preferably below 10 mol % and in particular below 5 mol %, for example below 4 mol %, based on the entirety of the alkylphenols used. The alkyl radicals (for the alkylphenols, this is generally understood to mean hydrocarbon radicals as defined below) may be the same or different in the alkylphenol-aldehyde resins usable in the process according to the invention, they may be saturated or unsaturated and have 1-200, preferably 1-20, in particular 4-12 carbon atoms; they are preferably n-, iso- and tert-butyl, n- and isopentyl, n- and isohexyl, n- and isooctyl, n- and isononyl, n- and isodecyl, n- and isododecyl, tetradecyl, hexadecyl, octadecyl, tripropenyl, tetrapropenyl, poly(propenyl) and poly(isobutenyl) radicals. These radicals are preferably saturated.

Suitable alkylphenol resins may also contain structural units of further phenol analogs such as salicylic acid, hydroxybenzoic acid and their derivatives, such as esters, amides and/or salts, or consist of them.

Suitable aldehydes for the preparation of the inventive alkylphenol-aldehyde resins are those having from 1 to 12 carbon atoms and preferably those having from 1 to 4 carbon atoms, for example formaldehyde, acetaldehyde, propionaldehyde, butyraldehyde, 2-ethylhexanal, benzaldehyde, glyoxalic acid and their reactive equivalents such as paraformaldehyde and trioxane. Particular preference is given to formaldehyde in the form of paraformaldehyde and in particular formalin.

The inventive alkylphenol resins have molecular weights, preferably measured by means of gel permeation chromatography against poly(styrene) standards in THF, of from 400 to 25 000 g/mol, preferably from 600 to 10 000 g/mol and especially from 800 to 5000 g/mol, for example from 900 to 3000 g/mol. The polydispersity Mw/Mn is preferably between 1.2 and 4.0, more preferably between 1.5 and 3.0. A prerequisite here is that the alkylphenol-aldehyde resins are oil-soluble at least in concentrations relevant to use of from 0.001 to 1% by weight.

Suitable fatty acids for preparing the inventive alkylphenol resins have preferably from 6 to 40, in particular from 10 to 26 and especially from 12 to 22 carbon atoms. The alkenyl radicals and any alkyl radicals of the fatty acids consist essentially of carbon and hydrogen. However, they may also bear further substituents, for example hydroxyl or halogen groups, provided that they do not impair the predominant hydrocarbon character. Preference is given to fatty acids having linear and branched hydrocarbon radicals, particular preference to linear radicals. The fatty acids preferably contain at least one double bond. This is preferably not in the $\alpha,\beta$-position to the carboxyl function. They may contain a plurality of double bonds, for example 2 or 3 double bonds, and be of natural of synthetic origin. In the case of polyunsatu-rated carboxylic acids, their double bonds may be isolated or else conjugated. Preference is given to mixtures of two or more unsaturated fatty acids having from 10 to 26 carbon atoms. In particularly preferred fatty acid mixtures, at least 50% by weight, especially at least 75% by weight, for example at least 90% by weight of the fatty acids have one or more double bonds. The iodine numbers of the parent fatty acids or fatty acid mixtures of the inventive esters are preferably above 50 g of I/100 g, more preferably between 60 and 190 g of I/100 g, in particular between 100 and 180 g of I/100 g and especially between 120 and 180 g of I/100 g of fatty acid or fatty acid mixture.

Suitable unsaturated fatty acids are, for example, oleic acid, erucic acid, palmitoleic acid, myristoleic acid, linoleic acid, linolenic acid, elaeosteric acid, arachidonic acid and/or ricinolic acid. Preference is given in accordance with the invention to fatty acid mixtures obtained from natural fats and oils, for example coconut oil fatty acid, peanut oil fatty acid, fish oil fatty acid, linseed oil fatty acid, palm oil fatty acid, rapeseed oil fatty acid, ricinene oil fatty acid, castor oil fatty acid, colza oil fatty acid, soybean oil fatty acid, sunflower oil fatty acid, safflower oil fatty acid and tall oil fatty acid, and also fractions obtained therefrom, for example by distillation.

Likewise suitable as a constituent of the fatty acid mixtures are dicarboxylic acids such as dimer fatty acids and alkyl- and alkenylsuccinic acids having $C_8$-$C_{50}$-alk(en)yl radicals, preferably having $C_8$-$C_{40}$-, in particular having $C_{12}$-$C_{22}$-alk(en)yl radicals. The alkyl radicals may be linear or else branched (oligomerized alkenes, polyisobutylene), and saturated or unsaturated. Preference is given to proportions of up to 10% by weight, in particular less than 5% by weight, based on constituent A.

Preferred fatty acid mixtures comprise minor amounts, i.e. up to 20% by weight, preferably less than 10% by weight, in particular less than 5% by weight and especially less than 2% by weight, of saturated fatty acids, for example lauric acid, tridecanoic acid, myristic acid, pentadecanoic acid, palmitic acid, margaric acid, stearic acid, isostearic acid, arachic acid and behenic acid.

The fatty acids may also comprise minor amounts of up to 20% by weight, preferably up to 25% by weight, for example from 1 to 5% by weight, of resin acids, for example abietic acid, dihydroabietic acid, tetrahydroabietic acid, dehydroabietic acid, neoabietic acid, pimaric acid, levopimaric acid, palustric acid and derivatives thereof. They more preferably contain less than 2% by weight and they are especially essentially free of resin acids.

Particularly suitable fatty acid esters for preparing the inventive alkylphenol resins are those which derive from abovementioned fatty acids and lower alcohols having from 1 to 5 carbon atoms, particular preference being given to esters of the abovementioned fatty acids with lower alcohols having from 1 to 5 carbon atoms and only one OH group. Examples of particularly suitable alcohols are methanol, ethanol and propanol, especially methanol. Particularly suitable fatty acid esters are esters derived from vegetable oils, such as rapeseed oil methyl ester, sunflower oil methyl ester, soy fatty acid methyl ester, palm oil acid methyl ester and tallow oil fatty acid methyl ester. Also suitable are esters of polyhydric alcohols having from 2 to 6 OH groups, preferably having 2 or 3 OH groups, for example ethylene glycol, diethylene glycol, glycerol and trimethylolpropane.

The fatty acid esters are preparable from alcohols and fatty acids in a known manner by esterification. Preference is given to the transesterification of naturally occurring fats and oils with lower alcohols and especially with methanol to form glycerol as a by-product. Preference is given to those esters which are preparable from a fatty acid mixture.

For use in middle distillates such as diesel and heating oil, particular preference is given to inventive alkylphenol-formaldehyde resins having $C_2$-$C_{40}$-alkyl radicals of the alkylphenol, preferably having $C_4$-$C_{20}$-alkyl radicals, for example $C_6$-$C_{12}$-alkyl radicals. The alkyl radicals may be linear or branched, and are preferably linear. Particularly suitable alkylphenol-aldehyde resins derive from linear alkyl radicals having 8 and 9 carbon atoms. The mean molecular weight, determined by means of GPC, is preferably between 700 and 20 000 g/mol, in particular between 800 and 10 000 g/mol, for example between 1000 and 3000 g/mol. The degree of polymerization n is preferably from 1 to 20, in particular from 2 to 15, for example from 5 to 10. The terminal $R^1$ radicals derive preferably from lower alkyl esters of unsaturated fatty acids and especially from methyl esters of vegetable oils and fats.

For use in gasoline and jet fuel, particular preference is given to inventive alkylphenol-formaldehyde resins whose alkyl radicals bear from 4 to 200 carbon atoms, preferably from 10 to 180 carbon atoms and derive from oligomers or polymers of olefins having from 2 to 6 carbon atoms, for example from poly(isobutylene). They are thus preferably branched. The degree of polymerization (n) here is preferably between 2 and 50, more preferably between 3 and 20 alkylphenol units. The terminal $R^1$ radicals derive preferably from lower alkyl esters of unsaturated fatty acids and especially from methyl esters of vegetable oils and fats.

For the purpose of simple handling, the inventive alkylphenol-aldehyde resins are preferably used as concentrates which contain from 10 to 90% by weight and preferably from 20 to 60% by weight of solvents. Suitable solvents are relatively high-boiling aliphatic hydrocarbons, aromatic hydrocarbons, alcohols, esters, ethers and mixtures thereof. However, particularly preferred solvents from an ecological point of view are the fatty acids and derivatives thereof which are also suitable as a reaction medium, and especially the above-mentioned fatty acid esters.

The inventive compounds find use as additives for mineral oil distillates alone or in a mixture with other constituents, and are therefore referred to below as inventive additives.

The inventive additives may be added to middle distillates to improve the cold flowability, also in combination with further additives, for example ethylene copolymers, polar nitrogen compounds, comb polymers, polyoxyalkylene compounds and/or olefin copolymers.

When the inventive additives are used for middle distillates, they also contain, in a preferred embodiment, one or more of constituents II to VI in addition to the inventive resins.

Thus, they preferably comprise copolymers of ethylene and olefinically unsaturated compounds, especially unsaturated esters, as constituent II. Suitable ethylene copolymers are in particular those which contain, in addition to ethylene, from 6 to 21 mol %, in particular from 10 to 18 mol %, of comonomers.

The olefinically unsaturated compounds are preferably vinyl esters, acrylic esters, methacrylic esters, alkyl vinyl ethers and/or alkenes, and the compounds mentioned may be substituted by hydroxyl groups. One or more comonomers may be present in the polymer.

The vinyl esters are preferably those of the formula 1

$$CH_2=CH-OCOR^1 \qquad (1)$$

where $R^1$ is $C_1$- to $C_{30}$-alkyl, preferably $C_4$- to $C_{16}$-alkyl, especially $C_6$- to $C_{12}$-alkyl. In a further embodiment, the alkyl groups mentioned may be substituted by one or more hydroxyl groups.

In a further preferred embodiment, $R^1$ is a branched alkyl radical or a neoalkyl radical having from 7 to 11 carbon atoms, in particular having 8, 9 or 10 carbon atoms. Particularly preferred vinyl esters derive from secondary and especially tertiary carboxylic acids whose branch is in the alpha-position to the carbonyl group. Suitable vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate and Versatic esters such as vinyl neononanoate, vinyl neodecanoate, vinyl neoundecanoate.

In a further preferred embodiment, these ethylene copolymers contain vinyl acetate and at least one further vinyl ester of the formula 1 where $R^1$ is $C_4$- to $C_{30}$-alkyl, preferably $C_4$- to $C_{16}$-alkyl, especially $C_6$- to $C_{12}$-alkyl.

The acrylic esters are preferably those of the formula 2

$$CH_2=CR^2-COOR^3 \qquad (2)$$

where $R^2$ is hydrogen or methyl and $R^3$ is $C_1$- to $C_{30}$-alkyl, preferably $C_4$- to $C_{16}$-alkyl, especially $C_6$- to $C_{12}$-alkyl. Suitable acrylic esters include, for example, methyl (meth)acrylate, ethyl (meth)acrylate, propyl (meth)acrylate, n- and isobutyl (meth)acrylate, hexyl, octyl, 2-ethylhexyl, decyl, dodecyl, tetradecyl, hexadecyl, octadecyl (meth)acrylate and mixtures of these comonomers. In a further embodiment, the alkyl groups mentioned may be substituted by one or more hydroxyl groups. An example of such an acrylic ester is hydroxyethyl methacrylate.

The alkyl vinyl ethers are preferably compounds of the formula 3

$$CH_2=CH-OR^4 \qquad (3)$$

where $R^4$ is $C_1$- to $C_{30}$-alkyl, preferably $C_4$- to $C_{16}$-alkyl, especially $C_6$- to $C_{12}$-alkyl. Examples include methyl vinyl ether, ethyl vinyl ether, isobutyl vinyl ether. In a further embodiment, the alkyl groups mentioned may be substituted by one or more hydroxyl groups.

The alkenes are preferably monounsaturated hydrocarbons having from 3 to 30 carbon atoms, in particular from 4 to 16 carbon atoms and especially from 5 to 12 carbon atoms. Suitable alkenes include propene, butene, isobutylene, pentene, hexene, 4-methylpentene, octene, diisobutylene and norbornene and derivatives thereof such as methylnorbornene and vinylnorbornene. In a further embodiment, the alkyl groups mentioned may be substituted by one or more hydroxyl groups.

Apart from ethylene, particularly preferred terpolymers of vinyl 2-ethylhexanoate, of vinyl neononanoate or of vinyl neodecanoate contain from 0.1 to 12 mol %, in particular from 0.2 to 5 mol %, of the particular long-chain vinyl ester, and from 3.5 to 20 mol %, in particular from 8 to 15 mol %, of vinyl acetate, the total comonomer content being between 8 and 21 mol %, preferably between 12 and 18 mol %. Further particularly preferred copolymers contain, in addition to ethylene and from 8 to 18 mol % of vinyl esters, also from 0.5 to 10 mol % of olefins such as propene, butene, isobutylene, hexene, 4-methylpentene, octene, diisobutylene and/or norbornene.

These ethylene co- and terpolymers preferably have melt viscosities at 140° C. of from 20 to 10 000 mPas, in particular from 30 to 5000 mPas, especially from 50 to 2000 mPas. The degrees of branching determined by means of $^1$H NMR spectroscopy are preferably between 1 and 9 $CH_3$/100 $CH_2$ groups, in particular between 2 and 6 $CH_3$/100 $CH_2$ groups, which do not stem from the comonomers.

Preference is given to using mixtures of two or more of the above-mentioned ethylene copolymers. More preferably, the polymers on which the mixtures are based differ in at least one characteristic. For example, they may contain different comonomers, or have different comonomer contents, molecular weights and/or degrees of branching.

The mixing ratio between the inventive alkylphenol resins and ethylene copolymers as constituent II may, depending on the application, vary within wide limits, the ethylene copolymers II often constituting the major proportion. Such additive mixtures preferably contain from 2 to 70% by weight, preferably from 3 to 50% by weight and especially from 5 to 20% by weight, of the inventive alkylphenol resins, and also from 30 to 98% by weight, preferably from 50 to 97% by weight and especially from 70 to 95% by weight, of ethylene copolymers.

The suitable oil-soluble polar nitrogen compounds (constituent III) are preferably reaction products of fatty amines with compounds which contain an acyl group. The preferred amines are compounds of the formula $NR^6R^7R^8$ where $R^6$, $R^7$ and $R^8$ may be the same or different, and at least one of these groups is $C_8$-$C_{36}$-alkyl, $C_6$-$C_{36}$-cycloalkyl or $C_8$-$C_{36}$-alkenyl, in particular $C_{12}$-$C_{24}$-alkyl, $C_{12}$-$C_{24}$-alkenyl or cyclohexyl, and the remaining groups are either hydrogen, $C_1$-$C_{36}$-alkyl, $C_2$-$C_{36}$-alkenyl, cyclohexyl, or a group of the formulae -(A-O)$_x$-E or —(CH$_2$)$_n$—NYZ, where A is an ethyl or propyl group, x is a number from 1 to 50, E=H, $C_1$-$C_{30}$-alkyl, $C_5$-$C_{12}$-cycloalkyl or $C_6$-$C_{30}$-aryl, and n=2, 3 or 4, and Y and Z are each independently H, $C_1$-$C_{30}$-alkyl or -(A-O)$_x$. The alkyl and alkenyl radicals may each be linear or branched and contain up to two double bonds. They are preferably linear and substantially saturated, i.e. they have iodine numbers of less than 75 g of $I_2$/g, preferably less than 60 g of $I_2$/g and in particular between 1 and 10 g of $I_2$/g. Particular preference is given to secondary fatty amines in which two of the $R^6$, $R^7$ and $R^8$ groups are each $C_8$-$C_{36}$-alkyl, $C_6$-$C_{36}$-cycloalkyl, $C_8$-$C_{36}$-alkenyl, in particular $C_{12}$-$C_{24}$-alkyl, $C_{12}$-$C_{24}$-alkenyl or cyclohexyl. Suitable fatty amines are, for example, octylamine, decylamine, dodecylamine, tetradecylamine, hexadecylamine, octadecylamine, eicosylamine, behenylamine, didecylamine, didodecylamine, ditetradecylamine, dihexadecylamine, dioctadecylamine, dieicosylamine, dibehenylamine and mixtures thereof. The amines especially contain chain cuts based on natural raw materials, for example coconut fatty amine, tallow fatty amine, hydrogenated tallow fatty amine, dicoconut fatty amine, ditallow fatty amine and di(hydrogenated tallow fatty amine). Particularly preferred amine derivatives are amine salts, imides and/or amides, for example amide-ammonium salts of secondary fatty amines, in particular of dicoconut fatty amine, ditallow fatty amine and distearylamine.

Acyl group refers here to a functional group of the following formula:

Carbonyl compounds suitable for the reaction with amines are either monomeric or polymeric compounds having one or more carboxyl groups. Preference is given to those monomeric carbonyl compounds having 2, 3 or 4 carbonyl groups. They may also contain heteroatoms such as oxygen, sulfur and nitrogen. Suitable carboxylic acids are, for example, maleic acid, fumaric acid, crotonic acid, itaconic acid, succinic acid, $C_1$-$C_{40}$-alkenylsuccinic acid, adipic acid, glutaric acid, sebacic acid and malonic acid, and also benzoic acid, phthalic acid, trimellitic acid and pyromellitic acid, nitrilotriacetic acid, ethylenediaminetetraacetic acid and their reactive derivatives, for example esters, anhydrides and acid halides. Useful polymeric carbonyl compounds have been found to be in particular copolymers of ethylenically unsaturated acids, for example acrylic acid, methacrylic acid, maleic acid, fumaric acid and itaconic acid; particular preference is given to copolymers of maleic anhydride. Suitable comonomers are those which confer oil solubility on the copolymer. Oil-soluble means here that the copolymer, after reaction with the fatty amine, dissolves without residue in the middle distillate to be additized in practically relevant dosages. Suitable comonomers are, for example, olefins, alkyl esters of acrylic acid and methacrylic acid, alkyl vinyl esters, alkyl vinyl ethers having from 2 to 75, preferably from 4 to 40 and in particular from 8 to 20, carbon atoms in the alkyl radical. In the case of olefins, the carbon number is based on the alkyl radical attached to the double bond. The molecular weights of the polymeric carbonyl compounds are preferably between 400 and 20 000, more preferably between 500 and 10 000, for example between 1000 and 5000.

It has been found that particularly useful oil-soluble polar nitrogen compounds are those which are obtained by reaction of aliphatic or aromatic amines, preferably long-chain aliphatic amines, with aliphatic or aromatic mono-, di-, tri- or tetracarboxylic acids or their anhydrides (cf. U.S. Pat. No. 4,211,534). Equally suitable as oil-soluble polar nitrogen compounds are amides and ammonium salts of aminoalkylenepolycarboxylic acids such as nitrilotriacetic acid or ethylenediaminetetraacetic acid with secondary amines (cf. EP 0 398 101). Other oil-soluble polar nitrogen compounds are copolymers of maleic anhydride and α,β-unsaturated compounds which may optionally be reacted with primary monoalkylamines and/or aliphatic alcohols (cf. EP-A-0 154 177, EP 0 777 712), the reaction products of alkenyl-spirobislactones with amines (cf. EP-A-0 413 279 B1) and, according to EP-A-0 606 055 A2, reaction products of terpolymers based on α,β-unsaturated dicarboxylic anhydrides, α,β-unsaturated compounds and polyoxyalkylene ethers of lower unsaturated alcohols.

The mixing ratio between the inventive alkylphenol resins and oil-soluble polar nitrogen compounds as constituent III may vary depending upon the application. Such additive mixtures preferably contain, based on the active ingredients, from 0.1 to 10 parts by weight, preferably from 0.2 to 5 parts by weight, of at least one oil-soluble polar nitrogen compound per part by weight of the inventive alkylphenol resin.

Suitable comb polymers (constituent IV) may be described, for example, by the formula

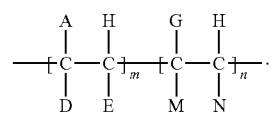

In this formula
A is R', COOR', OCOR', R"-COOR', OR';
D is H, $CH_3$, A or R";
E is H, A;
G is H, R", R"-COOR', an aryl radical or a heterocyclic radical;

M is H, COOR", OCOR", OR", COOH;
N is H, R", COOR", OCOR", an aryl radical;
R' is a hydrocarbon chain having from 8 to 50 carbon atoms;
R" is a hydrocarbon chain having from 1 to 10 carbon atoms;
m is between 0.4 and 1.0; and
n is between 0 and 0.6.

Suitable comb polymers are, for example copolymers of ethylenically unsaturated dicarboxylic acids such as maleic acid or fumaric acid with other ethylenically unsaturated monomers such as olefins or vinyl esters, for example vinyl acetate. Particularly suitable olefins are α-olefins having from 10 to 24 carbon atoms, for example 1-decene, 1-dodecene, 1-tetradecene, 1-hexadecene, 1-octadecene and mixtures thereof. Also suitable as comonomers are longer-chain olefins based on oligomerized $C_2$-$C_6$-olefins, for example poly(isobutylene), having a high content of terminal double bonds. Typically, these copolymers are esterified to an extent of at least 50% with alcohols having from 10 to 22 carbon atoms. Suitable alcohols include n-decan-1-ol, n-dodecan-1-ol, n-tetradecan-1-ol, n-hexadecan-1-ol, n-octadecan-1-ol, n-eicosan-1-ol and mixtures thereof. Particular preference is given to mixtures of n-tetradecan-1-ol and n-hexadecan-1-ol. Likewise suitable as comb polymers are poly(alkyl acrylates), poly(alkyl methacrylates) and poly(alkyl vinyl ethers), which derive from alcohols having 12 to 20 carbon atoms and poly(vinyl esters), which derive from fatty acids having from 12 to 20 carbon atoms.

Suitable polyoxyalkylene compounds (constituent V) are, for example, esters, ethers and ether/esters of polyols which bear at least one alkyl radical having from 12 to 30 carbon atoms. When the alkyl groups stem from an acid, the remainder stems from a polyhydric alcohol; when the alkyl radicals come from a fatty alcohol, the remainder of the compound stems from a polyacid.

Suitable polyols for preparing constituent V are polyethylene glycols, polypropylene glycols, polybutylene glycols and copolymers thereof having a molecular weight of from approx. 100 to approx. 5000, preferably from 200 to 2000 g/mol. Also suitable are alkoxylates of polyols, for example of glycerol, trimethylolpropane, pentaerythritol, neopentyl glycol, and the oligomers which are obtainable therefrom by condensation and have from 2 to 10 monomer units, for example polyglycerol. Preferred alkoxylates are those having from 1 to 100 mol, in particular from 5 to 50 mol, of ethylene oxide, propylene oxide and/or butylene oxide per mole of polyol. Esters are particularly preferred.

Fatty acids having from 12 to 26 carbon atoms are preferred for the reaction with the polyols to form the ester additives, and particular preference is given to using $C_{18}$- to $C_{24}$-fatty acids, especially stearic and behenic acid. The esters may also be prepared by esterifying polyoxyalkylated alcohols. Preference is given to fully esterified polyoxyalkylated polyols having molecular weights of from 150 to 2000, preferably from 200 to 600. Particularly suitable are PEG-600 dibehenate and glycerol ethylene glycol tribehenate.

Suitable olefin copolymers (constituent VI) as a further constituent of the inventive additive may derive directly from monoethylenically unsaturated monomers, or may be prepared indirectly by hydrogenation of polymers which derive from polyunsaturated monomers such as isoprene or butadiene. Preferred copolymers contain, as well as ethylene, structural units which derive from α-olefins having from 3 to 24 carbon atoms and have molecular weights of up to 120 000 g/mol. Preferred α-olefins are propylene, butene, isobutene, n-hexene, isohexene, n-octene, isooctene, n-decene, isodecene. The comonomer content of α-olefins having 3 to 24 carbon atoms is preferably between 15 and 50 mol %, more preferably between 20 and 35 mol % and especially between 30 and 45 mol %. These copolymers may also contain small amounts, for example up to 10 mol %, of further comonomers, for example nonterminal olefins or nonconjugated olefins. Preference is given to ethylene-propylene copolymers. The olefin copolymers may be prepared by known methods, for example by means of Ziegler or metallocene catalysts.

Further suitable olefin copolymers are block copolymers which contain blocks composed of olefinically unsaturated aromatic monomers A and blocks composed of hydrogenated polyolefins B. Particularly suitable block copolymers have the structure $(AB)_n$ A and $(AB)_m$, where n is between 1 and 10 and m is between 2 and 10.

The mixing ratio between the inventive alkylphenol resins and comb polymers (constituent IV), polyoxyalkylene compounds (constituent V), olefin copolymers may vary depending upon the application. Such additive mixtures preferably contain, based on the active ingredients, from 0.1 to 10 parts by weight, preferably from 0.2 to 5 parts by weight, of at least one comb polymer, of at least one polyoxyalkylene compound and/or of an olefin copolymer per part by weight of the inventive alkylphenol resin.

The additives may be used alone or else together with other additives, for example with other pour point depressants or dewaxing assistants, with antioxidants, cetane number improvers, dehazers, demulsifiers, detergents, dispersants, antifoams, dyes, corrosion inhibitors, lubricity additives, sludge inhibitors, odorants and/or additives for lowering the cloud point.

The inventive additives are suitable for improving the cold flow properties and the lubricity of animal, vegetable and/or mineral fuel oils. In particular, they disperse the paraffins which precipitate out below the cloud point in middle distillates. In addition, they can also be used as corrosion inhibitors or demulsifiers in vegetable and/or mineral fuel oils. In the case of the formulation of additive packages which, in addition to the inventive alkylphenol-aldehyde resins, comprise in particular ethylene copolymers (component II) and polar nitrogen compounds (component III), there are fewer incompatibilities, so that stable formations are obtained even without the use of solubilizers. Especially in the case of use for additivation of fuels based on animal and/or vegetable oils, they are not mixed with aromatic hydrocarbons and especially not with polyaromatic hydrocarbons by virtue of the inventive additives.

In the course of handling during production and processing, the inventive additives lead to a lower level of health hazards for the workers involved. In addition, as a fuel constituent in the case of use as intended, they lead to a lower level of environmental burdens than the prior art additives.

The inventive additives are particularly suitable for improving the properties of mineral oils and mineral oil distillates such as jet fuel, gasoline, kerosene, diesel and heating oil, which, for the purpose of lowering the sulfur content, have been subjected to refining under hydrating conditions. These oils and mineral oil distillates contain preferably less than 350 ppm of sulfur and in particular less than 100 ppm of sulfur, for example less than 50 ppm or 10 ppm of sulfur. In addition, these oils contain preferably less than 25% by weight, in particular less than 22% by weight, for example less than 20% by weight of aromatics.

Middle distillate refers in particular to those mineral oils which are obtained by distillation of crude oil and evaporate in the range from 120 to 450° C., for example kerosene, jet fuel, diesel and heating oil. The inventive compositions are particularly advantageous in those middle distillates which have 90% distillation points below 360° C., in particular 350° C. and in special cases below 340° C. Aromatic compounds are understood to mean the totality of mono-, di- and polycyclic aromatic compounds, as can be determined by means of HPLC to DIN EN 12916 (2001 edition). The middle distillates may also comprise minor amounts, for example up to 20% by volume, of oils of animal and/or vegetable origin, for example rapeseed oil or rapeseed oil methyl ester.

EXAMPLES

Effectiveness of the Additives as Cold Flow Improvers

To assess the effect of the inventive additives on the cold flow properties of middle distillates, the inventive additives (A) were used with various coadditives. The ethylene copolymers (B) and paraffin dispersants (C) have the characteristics specified below.

The superior effectiveness of the inventive additives together with ethylene copolymers and paraffin dispersants for mineral oils and mineral oil distillates is described firstly with reference to the CFPP test (cold filter plugging test to EN 116).

In addition, the paraffin dispersancy in middle distillates is determined as follows in the short sediment test:

150 ml of the middle distillates admixed with the additive components specified in the table were cooled to −13° C. at −2° C./hour in 200 ml measuring cylinders in a cold cabinet and stored at this temperature for 16 hours. Subsequently, volume and appearance both of the sedimented paraffin phase and of the supernatant oil phase were determined and assessed visually. A small amount of sediment and an opaque oil phase show good paraffin dispersancy.

In addition, the lower 20% by volume was isolated and the cloud point was determined to IP 3015. Only a small deviation of the cloud point of the lower phase ($CP_{cc}$) from the blank value of the oil shows good paraffin dispersancy.

The following additives were used:

(A) alkylphenol resins

A1) preparation of an acid-catalyzed nonylphenol-formaldehyde resin in rapeseed oil methyl ester A 1 l stirred apparatus with water separator and $N_2$ flow was initially charged with 241 g of nonylphenol, 82 g of rapeseed oil methyl ester and 1.6 g of alkylbenzenesulfonic acid. The mixture was heated to 120° C. with stirring. 90 g of 35% formaldehyde solution were then added dropwise thereto and the water of reaction was distilled off. After the dropwise addition, the reaction mixture was heated to 145° C. and stirred at 145° C. for another 1 h. After cooling to 100° C., a further 126 g of rapeseed oil methyl ester were added.

The resulting polymer had a molecular weight Mw of 2700 g/mol and an acid number of 0.5 mg KOH/g. In the $^{13}C$ NMR spectrum (500 MHz, $CDCl_3$ solvent) of the polymer after removal of the solvent, signals at 174 and 51.5 ppm show the presence of a methyl ester, signals at 130 ppm the presence of olefinic double bonds and additional signals in the range from 8 to 42 ppm the presence of relatively long alkyl radicals.

A2) Preparation of an acid-catalyzed dodecylphenol-formaldehyde resin in rapeseed oil methyl ester A 500 ml stirred apparatus with water separator and $N_2$ flow was initially charged with 124.4 g of dodecylphenol, 132.0 g of rapeseed oil methyl ester and 1.4 g of alkylbenzenesulfonic acid. The mixture was heated to 120° C. with stirring. 42.2 g of 35% formaldehyde solution were then added dropwise thereto and the water of reaction was distilled off. After the dropwise addition, the reaction mixture was stirred at 120° C. for 1 h, then heated to 145° C. and stirred at this temperature for another 1 h.

The resulting polymer had a molecular weight Mw of 3200 g/mol and an acid number of 0.3 mg KOH/g. In the $^{13}C$ NMR spectrum (500 MHz, $CDCl_3$ solvent) of the polymer after removal of the solvent, signals at 174 and 51.5 ppm show the presence of a methyl ester, signals at 130 ppm the presence of olefinic double bonds and additional signals in the range from 8 to 42 ppm the presence of relatively long alkyl radicals.

A3) Preparation of an acid-catalyzed $C_{20/24}$ alkylphenol-formaldehyde resin in rapeseed oil methyl ester A 500 ml stirred apparatus with water separator and $N_2$ flow was initially charged with 115.7 g of $C_{20/24}$-alkylphenol and 158.3 g of rapeseed oil methyl ester. The mixture was heated to 120° C. with stirring. 26.0 g of 35% formaldehyde solution were then added dropwise thereto and the water of reaction was distilled off. After the dropwise addition, the reaction mixture was stirred at 120° C. for 1 h, then heated to 145° C. and stirred at this temperature for another 1 h.

The resulting polymer had a molecular weight Mw of 2500 g/mol and an acid number of 0.3 mg KOH/g. In the $^{13}C$ NMR spectrum (500 MHz, $CDCl_3$ solvent) of the polymer after removal of the solvent, signals at 174 and 51.5 ppm show the presence of a methyl ester, signals at 130 ppm the presence of olefinic double bonds and additional signals in the range from 8 to 42 ppm the presence of relatively long alkyl radicals.

A4) Preparation of an acid-catalyzed nonylphenol-formaldehyde resin in tall oil fatty acid A 500 ml stirred apparatus with water separator and $N_2$ flow was initially charged with 96.3 g of nonylphenol, 66.8 g of tall oil fatty acid and 0.64 g of alkylbenzenesulfonic acid. The mixture was heated to 120° C. with stirring. 36.2 g of 35% formaldehyde solution were then added dropwise thereto and the water of reaction was distilled off. After the dropwise addition, the reaction mixture was heated to 145° C. and stirred at 145° C. for another 1 h.

The resulting polymer had a molecular weight Mw of 2100 g/mol. In the $^{13}C$ NMR spectrum (500 MHz, $CDCl_3$ solvent) of the polymer after removal of the solvent, signals at 178 ppm show the presence of a carboxylic acid, signals at 130 ppm the presence of olefinic double bonds and additional signals in the range from 8 to 42 ppm the presence of relatively long alkyl radicals.

A5) Nonylphenol-formaldehyde resin prepared under acidic catalysis in Solvent Naphtha in analogy to A1 (comparative example). Mw=2400 g/mol, 50% in Solvent Naphtha A6) $C_{20/24}$ alkylphenol-formaldehyde resin prepared under acidic catalysis in Solvent Naphtha in analogy to A3 (comparative example). Mw=2700 g/mol, 50% in Solvent Naphtha (B) Characterization of the ethylene copolymers used B1 Copolymer of ethylene and 13.6 mol % of vinyl acetate having a melt viscosity of 120 mPas measured at 140° C.; 50% in kerosene B2 Terpolymer of ethylene, 13.7 mol % of vinyl acetate and 1.4 mol % of vinyl neodecanoate having a melt viscosity of 98 MPas measured at 140° C., 65% in kerosene B3 Mixture of two parts of copolymer B1 and one part of copolymer B2, 65% in kerosene.

(C) Characterization of the paraffin dispersants C used

C1 Reaction product of a dodecenyl-spirobislactone with a mixture of primary and secondary tallow fatty amine, 60% in Solvent Naphtha (prepared according to EP 0413279)

C2 Reaction product of a terpolymer of $C_{14/16}$-α-olefin, maleic anhydride and allylpolyglycol with 2 equivalents of ditallow fatty amine, 50% in Solvent Naphtha (prepared according to EP 0606055)

C3 Reaction product of phthalic anhydride and 2 equivalents of di(hydrogenated tallow fatty) amine, 50% in Solvent Naphtha (prepared according to EP 0 061 894)

C4 Reaction product of ethylenediaminetetraacetic acid with 4 equivalents of ditallow fatty amine to give the amide-ammonium salt, 50% in Solvent Naphtha (prepared according to EP 0 398 101).

TABLE 1

Characterization of the test oils:
The test oils employed were current oils from European refineries. The CFPP value was determined to EN 116 and the cloud point to ISO 3015. The aromatic hydrocarbon groups were determined to DIN EN 12916 (November 2001 edition)

|  | Test oil 1 | Test oil 2 | Test oil 3 | Test oil 4 |
|---|---|---|---|---|
| Distillation |  |  |  |  |
| IBP [° C.] | 161 | 184 | 169 | 167 |
| 20% [° C.] | 210 | 229 | 201 | 204 |

TABLE 1-continued

Characterization of the test oils:
The test oils employed were current oils from European refineries. The CFPP value was determined to EN 116 and the cloud point to ISO 3015. The aromatic hydrocarbon groups were determined to DIN EN 12916 (November 2001 edition)

|  | Test oil 1 | Test oil 2 | Test oil 3 | Test oil 4 |
|---|---|---|---|---|
| 90% [° C.] | 342 | 333 | 324 | 330 |
| FBP [° C.] | 365 | 360 | 344 | 357 |
| Cloud Point [° C.] | −9.7 | −6.7 | −6.0 | −5.8 |
| CFPP [° C.] | −13 | −9 | −8 | −8 |
| Sulfur [ppm] | 3 | 31 | 6 | 8 |
| Density @15° C. [g/cm$^3$] | 0.836 | 0.834 | 0.825 | 0.830 |

TABLE 2

Testing as cold flow improvers in test oil 1

Test oil 1 (CP −9.7° C.)

| Example | Additives A | B | C | CFPP [° C.] | Sediment [Vol.-%] | Appearance of oil phase | CPCC [° C.] |
|---|---|---|---|---|---|---|---|
|  | 50 ppm A1 | 300 ppm B1 | — | −26 | 10 | cloudy | −4.2 |
|  | 50 ppm A1 | 300 ppm B1 | 100 ppm C2 | −30 | 3 | opaque | −8.7 |
|  | 50 ppm A1 | 400 ppm B1 | — | −27 | 20 | cloudy | −4.8 |
|  | 50 ppm A1 | 350 ppm B1 | 100 ppm C2 | −30 | 1 | opaque | −9.3 |
|  | 50 ppm A1 | 450 ppm B1 | — | −28 | 15 | cloudy | −6.4 |
|  | 50 ppm A2 | 300 ppm B1 | 100 ppm C2 | −28 | 1 | opaque | −9.2 |
|  | 75 ppm A2 | 350 ppm B1 | 75 ppm C1 | −29 | 2 | opaque | −9.0 |
|  | 90 ppm A3 | 360 ppm B1 | 50 ppm C3 | −28 | 3 | opaque | −7.5 |
| (comp.) | — | 350 ppm B1 | — | −23 | 60 | clear | −1.6 |
| (comp.) | — | 450 ppm B1 | 100 ppm C2 | −23 | 40 | clear | −3.2 |
| (comp.) | 50 ppm A5 | 300 ppm B1 | 100 ppm C2 | −25 | 20 | cloudy | −3.8 |
| (comp.) | 50 ppm A5 | 350 ppm B1 | 100 ppm C2 | −27 | 30 | cloudy | −4.3 |

TABLE 3

Testing as cold flow improvers in test oil 2

Test oil 2 (CP −6.7° C.)

| Example | Additive A | B | C | CFPP | Sediment [Vol.-%] | Appearance of oil phase | $CP_{cc}$ [° C.] |
|---|---|---|---|---|---|---|---|
|  | 33 ppm A1 | 75 ppm B3 | 67 ppm C2 | −28 | 2 | opaque | −4.2 |
|  | 33 ppm A1 | 120 ppm B3 | 67 ppm C2 | −30 | 0 | opaque | −5.7 |
|  | 40 ppm A1 | 70 ppm B3 | 40 ppm C1 | −27 | 5 | opaque | −2.6 |
|  | 40 ppm A1 | 120 ppm B3 | 40 ppm C1 | −29 | 0 | opaque | −5.7 |
|  | 50 ppm A2 | 120 ppm B3 | 25 ppm C4 | −27 | 0 | opaque | −5.5 |
| (comp.) | 33 ppm A5 | 75 ppm B3 | 67 ppm C2 | −24 | 10 | clear | −1.5 |
| (comp.) | 40 ppm A5 | 70 ppm B3 | 40 ppm C1 | −24 | 20 | cloudy | −0.8 |
| (comp.) | 40 ppm A5 | 120 ppm B3 | 40 ppm C1 | −25 | 10 | cloudy | −3.9 |

TABLE 4

Testing as cold flow improvers in test oil 3

| | Additive | | | | Test oil 3 (CP −8.0° C.) | | |
| Example | A | B | C | CFPP | Sediment [Vol.-%] | Appearance of oil phase | $CP_{cc}$ [° C.] |
|---|---|---|---|---|---|---|---|
| | 80 ppm A1 | 300 ppm B3 | 160 ppm C2 | −28 | 10 | cloudy | −3.9 |
| | 80 ppm A2 | 300 ppm B3 | 160 ppm C2 | −29 | 15 | cloudy | −2.2 |
| | 80 ppm A1 | 300 ppm B3 | 160 ppm C4 | −28 | 10 | cloudy | −3.5 |
| (comp.) | 80 ppm A5 | 300 ppm B3 | 160 ppm C2 | −24 | 35 | clear | −0.5 |
| (comp.) | 80 ppm A5 | 300 ppm B3 | 160 ppm C4 | −22 | 30 | clear | 0.0 |

TABLE 5

Testing as cold flow improvers in test oil 4

| | Additive | | | | Test oil 4 (CP −8.0° C.) | | |
| Example | A | B | C | CFPP | Sediment [Vol.-%] | Appearance of oil phase | $CP_{cc}$ [° C.] |
|---|---|---|---|---|---|---|---|
| | 80 ppm A1 | 300 ppm B3 | 160 ppm C2 | −28 | 5 | opaque | −5.3 |
| | 80 ppm A2 | 300 ppm B3 | 160 ppm C2 | −30 | 5 | opaque | −6.1 |
| | 80 ppm A2 | 300 ppm B3 | 160 ppm C4 | −26 | 5 | opaque | −5.6 |
| (comp.) | 80 ppm A5 | 300 ppm B3 | 160 ppm C2 | −21 | 25 | clear | −3.2 |
| (comp.) | 80 ppm A5 | 300 ppm B3 | 160 ppm C4 | −21 | 25 | clear | −2.7 |

The experiments show that the inventive additives, with regard to the improvement in the cold flow properties and especially the lowering of the CFPP and the paraffin dispersancy of middle distillates, are superior to the prior art additives. They bring about improved paraffin dispersancy or, alternatively, comparable paraffin dispersancy at lower additive dosage.

Phase Stability of the Additives

To assess the phase stability of additive mixtures which comprise inventive additives, the active ingredients listed above in the mass ratios specified in table 6 were homogenized at 60° C. with stirring. Subsequently, the stability of the solutions was assessed visually after storing at 40° C. for one week.

TABLE 6

Phase stability of the additive mixtures

| | Additive | | | Visual |
| Example | A | B | C | assessment |
|---|---|---|---|---|
| | 15% A1 | 70% B2 | 15% C1 | Homogeneously opaque |
| | 15% A2 | 70% B2 | 15% C2 | Homogeneously opaque |
| (comp.) | 15% A6 | 70% B2 | 15% C2 | Biphasic |
| (comp.) | 15% A6 | 70% B1 | 15% C1 | Biphasic |

What is claimed is:

1. An alkylphenol-aldehyde resin containing oligo- or polymers having a repeat structural unit of the formula

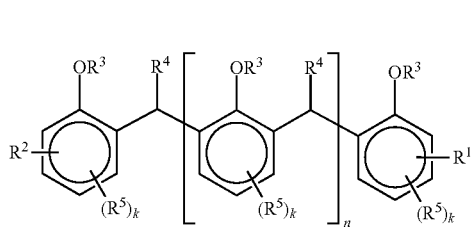

wherein
R$^1$ is a branched alkyl or alkenyl radical having from 10 to 40 carbon atoms and at least one carboxyl, carboxylate and/or ester group,
R$^2$ is hydrogen or R$^1$, wherein R$^1$ and R$^2$ are bonded to the aromatic ring system via a secondary carbon atom,
R$^3$ is hydrogen or an alkoxy group of the formula $-(A-O)_m-H$, A is a $C_2$- to $C_4$alkylene group,
m is from 1 to 100,
R$^4$ is hydrogen, a $C_1$- to $C_{11}$-alkyl radical or a carboxyl group.
R$^5$ is $C_1$-$C_{200}$-alkyl or -alkenyl, or O—R$^6$.
R$^6$ is $C_1$-$C_{200}$-alkyl or -alkenyl,
n is from 1 to 100 and
k is 1 or 2.

2. The alkylphenol-aldehyde resin as claimed in claim 1, where R1 is C12 to C22-alkyl or -alkenyl.

3. The alkylphenol-aldehyde resin of claim 1, where R3 is hydrogen.

4. The alkylphenol-aldehyde resin of claim 1, where A is an ethylene group.

5. The alkylphenol-aldehyde resin of claim 1, where R4 is hydrogen.

6. The alkylphenol-aldehyde resin of claim 1, where R5 and R6 are each independently C4- to C20-alkyl.

7. The alkylphenol-aldehyde resin of claim 1, where n is from 3 to 10.

8. A composition comprising at least one alkylphenol-aldehyde resin as claimed in claim 1 and at least one ethylenically unsaturated ester copolymer (constituent II).

9. A composition comprising at least one alkylphenol-aldehyde resin as claimed in claim 1 and at least one oil-soluble polar nitrogen compound (constituent III) which is a reaction product of fatty amine with compounds which contain an acyl group.

10. A composition comprising at least one alkylphenol-aldehyde resin as claimed in claim 1 and a comb polymer (constituent IV) of the formula

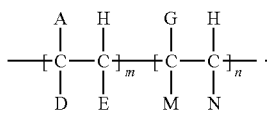

where
A is R', COOR', OCOR', R"-COOR', or OR';
D is H, CH$_3$, A or R";
E is H, or A;
G is H, R", R"-COOR', an aryl radical or a heterocyclic radical;
M is H, COOR", OCOR", OR", or COOH;
N is H, R", COOR", OCOR", or an aryl radical;
R' is a hydrocarbon chain having from 8 to 50 carbon atoms;
R" is a hydrocarbon chain having from 1 to 10 carbon atoms;
m is between 0.4 and 1.0; and
n is between 0 and 0.6.

11. A composition comprising at least one alkylphenol-aldehyde resin as claimed in claim 1 and at least one polyoxyalkylene compound (constituent V) which is selected from the group consisting of an ester, ether, an ether/ester of a polyol having at least one alkyl radical having from 12 to 30 carbon atoms, and mixtures thereof.

12. A composition comprising at least one alkylphenol-aldehyde resin as claimed in claim 1 and at least one olefin copolymer (constituent VI) which, optionally has ethylene, contains structural units which derive from α-olefins having from 3 to 24 carbon atoms, and said olefin copolymer has a molecular weight of up to 120 000 g/mol.

13. A fuel composition having a sulfur content of less than 350 ppm, comprising a mineral oil distillate or an oil obtained from vegetable or animal raw materials, and from 1 to 1000 ppm of the alkylphenol-aldehyde resin as claimed in claim 1 or a mixture of the alkylphenol-aldehyde resin of claim 1 and at least one additional constituent selected from the group consisting of ethylenically unsaturated ester copolymer (constituent II), oil-soluble polar nitrogen compound (constituent III), a comb polymer (constituent IV), polyoxyalkylene compound (constituent V), olefin copolymer (constituent VI), and mixtures thereof.

14. The fuel composition as claimed in claim 13, wherein the mineral oil distillate is a middle distillate.

15. A method for improving the lubricity of a middle distillate or an oil obtained from a vegetable or animal raw material having a sulfur content of less than 350 ppm, said method comprising adding to the middle distillate or oil an additive comprising the alkylphenol-aldehyde resin of claim 1.

16. A method for improving the cold properties of a middle distillate having a sulfur content of less than 350 ppm or of an oil obtained from vegetable or animal raw materials, said method comprising adding to the middle distillate or oil an additive comprising the alkylphenol-aldehyde resin of claim 1.

17. A method for splitting emulsions in a mixture comprising water and a middle distillate having a sulfur content of less than 350 ppm or an oil obtained from vegetable or animal raw materials, said method comprising adding to the mixture an additive comprising the alkylphenol-aldehyde resin of claim 1.

* * * * *